United States Patent
Foegelle

(10) Patent No.: US 9,979,496 B2
(45) Date of Patent: May 22, 2018

(54) SYSTEM AND METHOD FOR CALIBRATION AND MONITORING OF AN ANECHOIC BOUNDARY ARRAY RF ENVIRONMENT SIMULATOR

(71) Applicant: ETS-Lindgren Inc., Cedar Park, TX (US)

(72) Inventor: Michael David Foegelle, Cedar Park, TX (US)

(73) Assignee: ETS- Lindgren Inc., Cedar Park, TX (US)

( * ) Notice: Subject to any disclaimer, the term of this patent is extended or adjusted under 35 U.S.C. 154(b) by 30 days.

(21) Appl. No.: 14/962,299

(22) Filed: Dec. 8, 2015

(65) Prior Publication Data
US 2016/0344490 A1    Nov. 24, 2016

Related U.S. Application Data

(60) Provisional application No. 62/163,674, filed on May 19, 2015.

(51) Int. Cl.
| | |
|---|---|
| H04B 3/46 | (2015.01) |
| H04B 17/00 | (2015.01) |
| H04Q 1/20 | (2006.01) |
| H04B 17/391 | (2015.01) |
| H04B 17/11 | (2015.01) |

(52) U.S. Cl.
CPC ......... *H04B 17/3912* (2015.01); *H04B 17/11* (2015.01)

(58) Field of Classification Search
CPC ...... H04B 17/21; H04B 17/13; H04B 17/102; H04B 17/3912; H04B 17/11; H04B 1/0475
See application file for complete search history.

(56) References Cited

U.S. PATENT DOCUMENTS

| | | | |
|---|---|---|---|
| 8,331,869 B2 | 12/2012 | Foegelle | |
| 2002/0175751 A1* | 11/2002 | McMorrow | H03G 3/3042 330/129 |
| 2005/0245213 A1* | 11/2005 | Hirano | H03F 1/0205 455/127.1 |
| 2011/0299570 A1* | 12/2011 | Reed | H04B 7/0434 375/130 |
| 2012/0100813 A1* | 4/2012 | Mow | H04B 17/3911 455/67.12 |

(Continued)

*Primary Examiner* — Shuwang Liu
*Assistant Examiner* — Sung Ahn
(74) *Attorney, Agent, or Firm* — Christopher & Weisberg, P.A.

(57) ABSTRACT

Some embodiments include a system for simulating electromagnetic environments that includes a channel emulator having a plurality of outputs, each output associated with a different operational path. Each operational path has a power amplifier, an antenna and a first coupling mechanism. The power amplifier is coupled to an output of the channel emulator. The antenna is in communication with a test region of the apparatus. The first coupling mechanism simultaneously couples power to the antenna and to a first measurement path when the operational path is coupled to the test region, so that a calibration state of the operational path can be determined and adjusted without interruption of a signal coupled to the antenna in the operational path.

18 Claims, 7 Drawing Sheets

(56) References Cited

U.S. PATENT DOCUMENTS

| | | | | |
|---|---|---|---|---|
| 2012/0200354 A1* | 8/2012 | Ripley | ............... | H03F 1/0227 330/131 |
| 2013/0099985 A1* | 4/2013 | Gross | ............... | H04B 17/0087 343/703 |
| 2013/0303089 A1* | 11/2013 | Wang | ............... | H04W 24/06 455/67.12 |
| 2016/0344490 A1* | 11/2016 | Foegelle | ............... | H04B 17/11 |

* cited by examiner

SYSTEM AND METHOD FOR CALIBRATION AND MONITORING OF AN ANECHOIC BOUNDARY ARRAY RF ENVIRONMENT SIMULATOR

CROSS-REFERENCE TO RELATED APPLICATION

This application is related to and claims priority to U.S. Provisional Patent Application Ser. No. 62/163,674, filed May 19, 2015, entitled "SYSTEM AND METHOD FOR CALIBRATION AND MONITORING OF AN ANECHOIC BOUNDARY ARRAY RF ENVIRONMENT SIMULATOR", the entirety of which is incorporated herein by reference.

FIELD

A method and system for calibration and monitoring of a system for simulating electromagnetic environments such as an anechoic boundary array radio frequency (RF) environment simulator.

BACKGROUND

U.S. Pat. No. 8,331,869 describes a system and method for recreating any desired near-field RF environment such that the field arriving at a device under test appears to have arrived from a radiating far field. This approach is now commonly known as an anechoic boundary array method, due to the use of an anechoic chamber to isolate the simulated environment inside the chamber and due to the antennas arrayed about the central volume used to create the RF boundary conditions necessary to produce the desired near field condition.

While both passive and active realizations of the anechoic boundary array method have been used, the common approach uses advanced RF channel emulators to emulate spatial channel models in order to simulate the multipath environment outside the boundary array. These RF emulators were designed to be used for cabled testing of wireless radios and typically do not provide the output power or receiver sensitivity needed for radiated testing. In order to condition signals for testing over the air, amplifiers are used between the spatial channel emulators and the antennas of the boundary array, providing additional power and gain on downlink or uplink signals.

FIG. 1 illustrates a typical anechoic downlink-only boundary array configuration 10 wherein the antennas 12 and device under test (DUT) 14 are within an anechoic chamber shown encompassed by dashed lines. An object of a test of the DUT 14 may be to measure the performance of the antenna system of the DUT 14 in an environment that simulates multipath propagation. Thus, the DUT 14 may be, for example, a mobile phone for which over the air performance in a multipath environment is to be evaluated. The DUT 14 may be a device capable of multiple input multiple output (MIMO) reception and transmission, adaptive beam forming, and/or antenna diversity.

To test the DUT 14, a base station emulator 16 generates complex signals that emulate signals from a base station such as an eNodeB in a long term evolution (LTE) wireless communication network. The base station emulator 16 may also introduce interference signals. The signals from the base station emulator 16 are fed to spatial channel emulators 18a and 18b, referred to herein collectively as spatial channel emulators 18. The spatial channel emulators 18 introduce propagation and fading to the signals from the base station emulator, to emulate multipath propagation as would be experienced in a real world environment. Interfering signals may also be introduced within the channel emulator to simulate interference from other devices elsewhere in the environment.

The outputs of the spatial channel emulators 18 are fed to power amplifiers 20 which amplify the signals. Cables conduct the amplified signals from the power amplifiers to antennas 12 surrounding the DUT 14. The antennas 12 may be capable of dual polarization and transmission from any desired azimuth and elevation about the DUT 14. At least one uplink communication antenna 22 receives signals transmitted from the DUT 14 and transmits them to the base station emulator 16.

Alternate implementations of the system include an uplink only configuration, where the directions of propagation and orientation of active system components such as amplifiers and channel emulators are reversed; and bi-directional implementations where both uplink and downlink signal components are fed to/from the boundary array using either the same or different antennas.

Early implementations of the anechoic boundary array were designed with bypass switches which allowed routing the active and passive paths of the system to a centralized location. This provided options for calibrating the individual components, such as the power amplifiers 20, as well as for using the antennas of the boundary array for traditional passive antenna pattern measurements (APM) and over-the-air (OTA) performance testing of radiated power and sensitivity, with the switch array allowing for high speed changes in propagation direction in lieu of mechanical positioning of the measurement antenna or DUT.

An example of such a system is shown in FIG. 2, where different test equipment 17 can be routed through first switches 19 to the spatial channel emulator 18 and boundary array. In addition those same signals can be routed to bypass the spatial channel emulator 18 and amplifier 20 using the switches 19 to directly access the array antenna 12 via switches 21. Likewise, switches 21 may be used to route the output of the spatial channel emulator 18 and amplifier 20 back to test equipment 17 in order to measure path losses along the conducted paths. A switch 23 may also be used to route the output of the spatial channel emulator 18 to a device under test for conducted testing. Note that for simplicity return paths are not illustrated. A given instrument will have both input and output connections routed simultaneously along different routes of the possible paths offered by the switches 19, 21 and 23.

Unfortunately, the approach of using bypass switches to calibrate sub paths of the system suffers from a number of shortcomings, including the problem that static paths in the system must be independently calibrated to remove their RF impact from that of the desired path between the test equipment and the center of the test volume. Also, the use of switches to change the path between the measurement path and the calibration path results in changes in the electrical lengths of intervening cables, which in turn, results in a different standing wave contribution between the measurement path and the calibration path.

Traditional range calibration techniques for APM and OTA testing disfavor the use of component testing in favor of end-to-end calibrations. Hence, over time, techniques for performing full end-to-end calibrations of the boundary array were developed which eliminated the need for manual or automated component testing of the individual active and passive system components.

FIG. 3 shows a single path of the MIMO system of FIG. 1. The signal routing 24, 26a and 26b enable connections to different communication test equipment as well as to different antennas within the anechoic chamber. Routes for performing conducted testing of radios (not pictured) using the same channel emulator 18 are commonly employed, also. By measuring the total path loss of the system with a constant tap channel model with known loss terms in the channel emulator, the losses of the various components external to the channel emulator, such as the signal routing 24 and 25 and the power amplifier 20, can be determined. These losses may then be applied to the internal losses associated with any other channel model in order to determine the power correction needed for device testing.

FIG. 4 illustrates a typical end-to-end calibration process of the path of FIG. 3, where a reference antenna 28 with a known gain relative to an isotropic radiator/receiver is placed in the test volume and used to determine the net path loss. The additional path loss components due to transmit and receive cables and connectors, as well as the reference antenna gain and internal losses of the vector network analyzer 30 or other test equipment, must all be applied as corrections to the measurement in order to determine the desired total path loss. Alternately, the signal routing connections may be used to measure sub-components of the total path, given the necessary corrections for the additional path loss components involved in the different signal routings. While automating switching for this purpose provides for relatively quick measurements of the various paths, this approach is generally inconvenient to set up since each of the added loss terms, including the relative differences through the switches for the calibration signal path vs. the path to the test volume, must be determined independently (with the associated measurement uncertainty) and then assumed to never change throughout the life of the system.

Despite the elimination of the need for calibration of individual components by using and end-to-end calibration, the overall complexity of the boundary array system does point to the necessity of a mechanism for monitoring the performance of the system on a regular basis. Evaluation of the total field produced in the center of the test volume is a first order approach to determining system accuracy, but can't detect degradation in a single system component from the aggregate sum of all of the signals within the chamber. It also generally requires additional process steps by the user to place a reference antenna within the test volume and perform the power validation. Given the capabilities of a typical channel emulator, it is possible to utilize a probing antenna somewhere outside the test volume to iteratively evaluate the output of each element in the array, at the cost of the additional test time involved in enabling and disabling each output of the channel emulation. By referencing the result to a reference measurement performed after the original range calibration, it is then possible to perform a non-intrusive evaluation of any drift in the system components, although at the cost of additional test time.

BRIEF DESCRIPTION OF THE DRAWINGS

A more complete understanding of the embodiments described herein, and the attendant advantages and features thereof, will be more readily understood by reference to the following detailed description when considered in conjunction with the accompanying drawings wherein.

DETAILED DESCRIPTION

Figure 1:
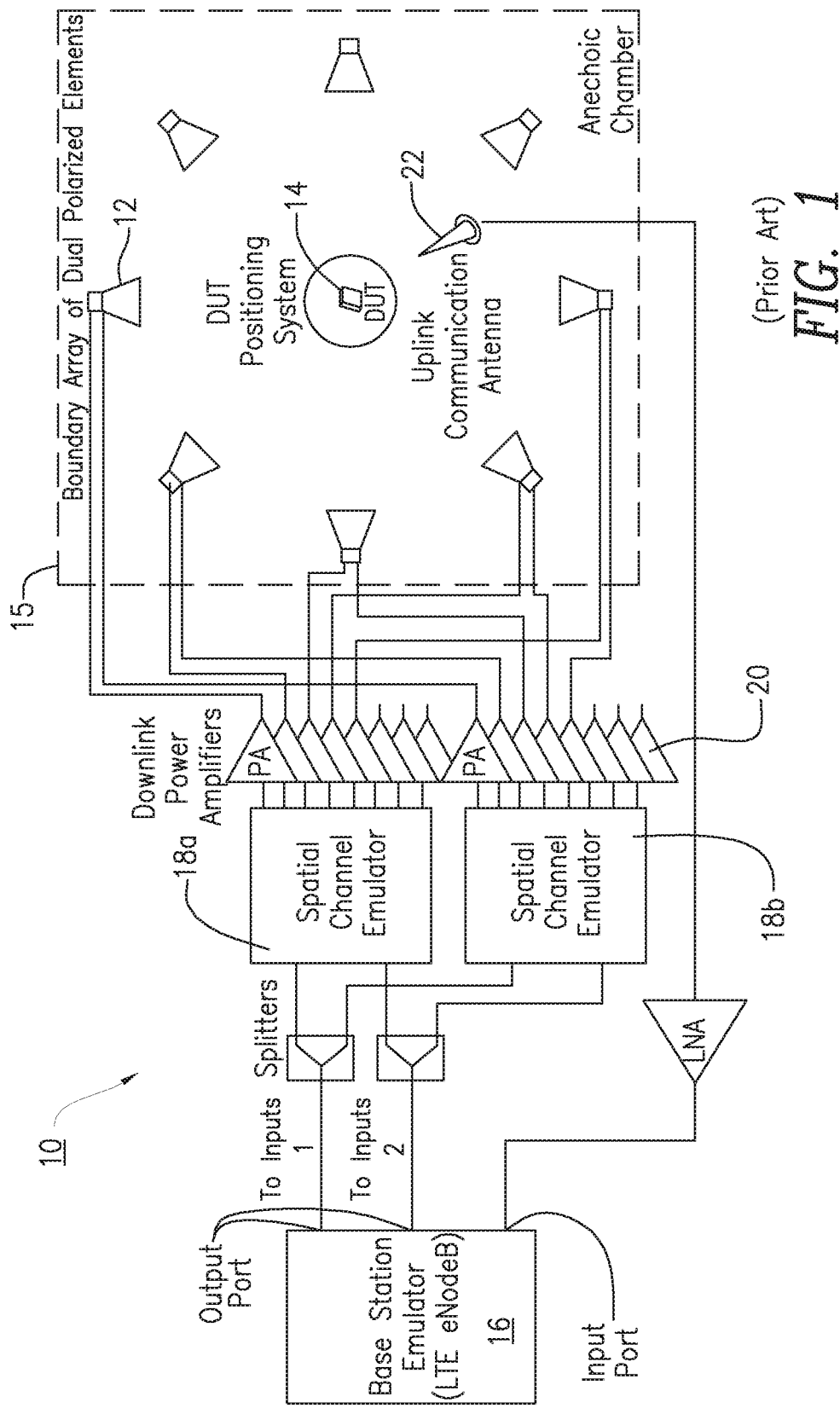
FIG. 1 illustrates a known system for simulating electromagnetic environments commonly referred to as an anechoic boundary array test apparatus.
Figure 2:
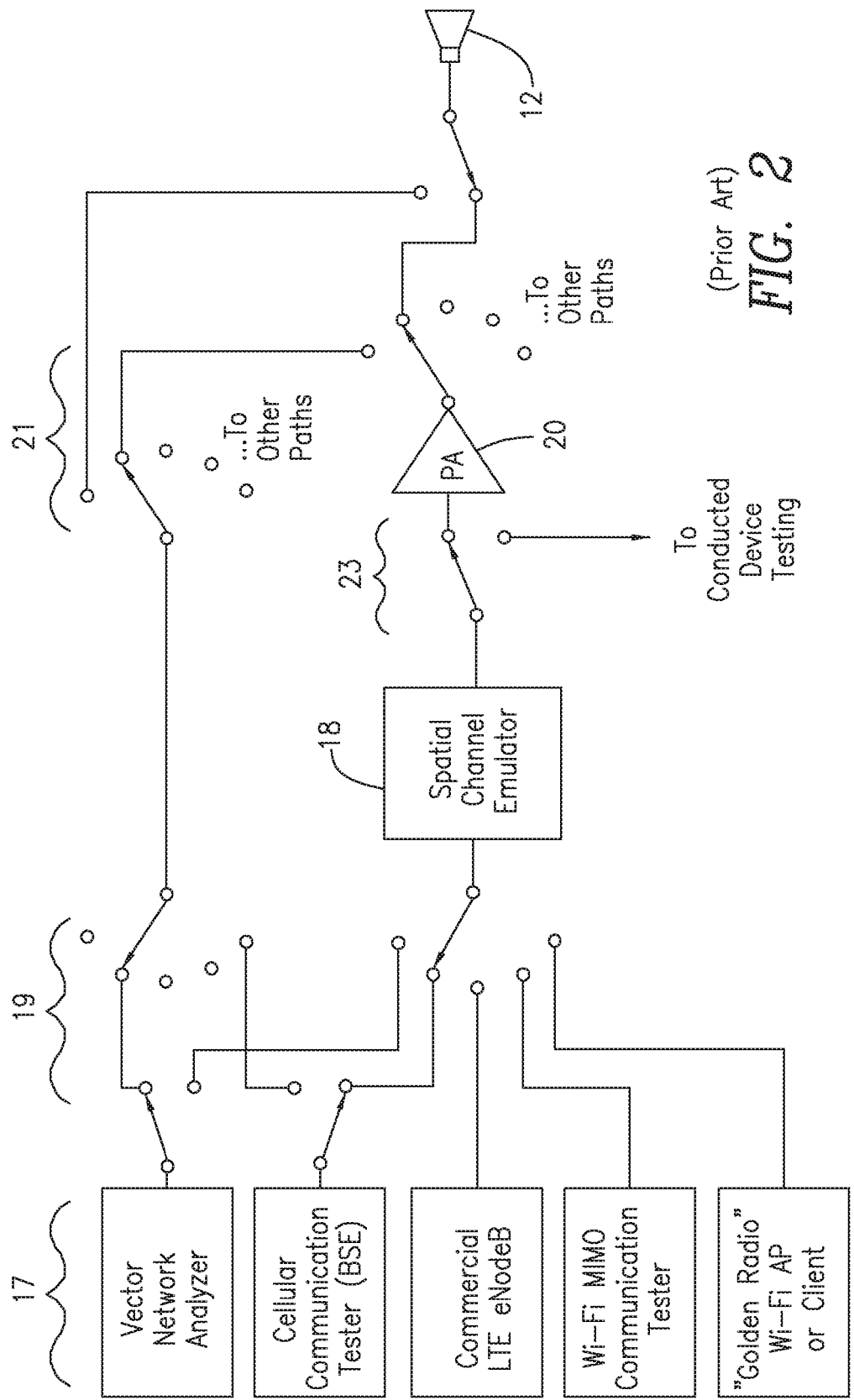
FIG. 2 illustrates known switching for offline calibration of portions of an operational path of a system for simulating electromagnetic environments.
Figure 3:
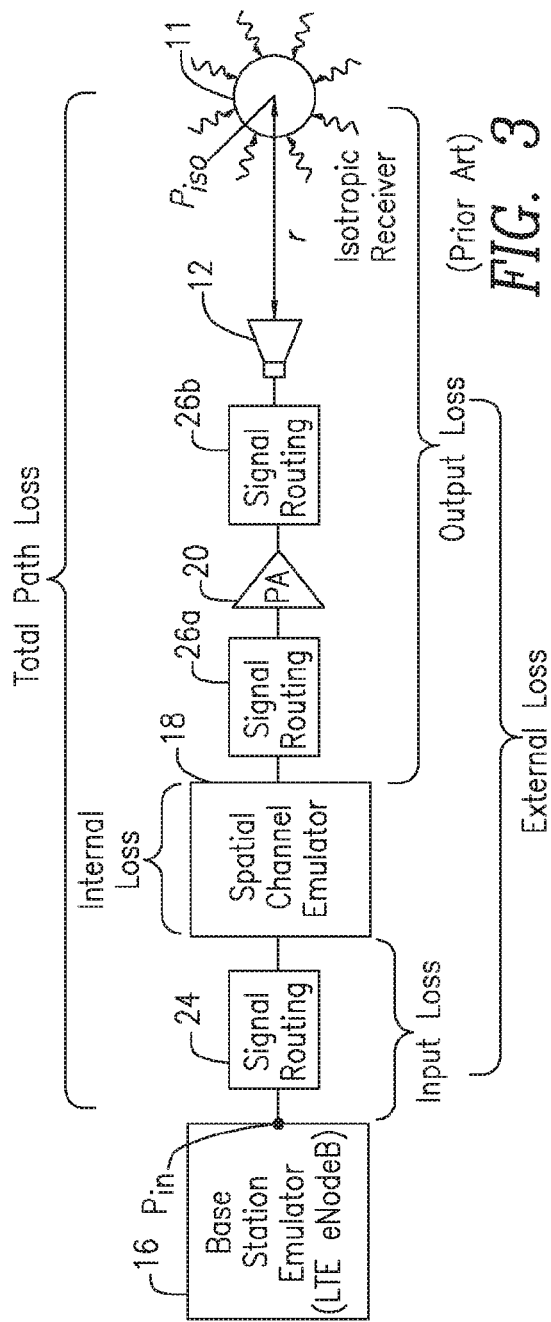
FIG. 3 illustrates a known individual path of a system for simulating electromagnetic environments with signal routing.
Figure 4:
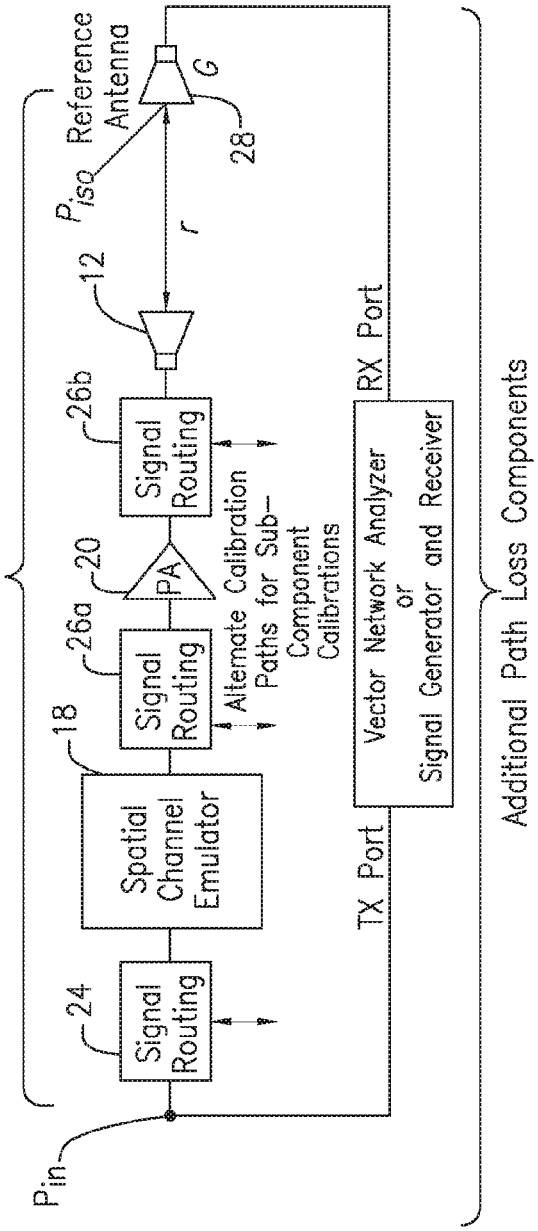
FIG. 4 illustrates a known end-to-end calibration test configuration for an individual path of a system for simulating electromagnetic environments.

Before describing in detail exemplary embodiments, it is noted that the embodiments reside primarily in combinations of apparatus components and processing steps related to calibration and monitoring of active components in a system for simulating electromagnetic environments. Accordingly, the system and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments described herein, conducted paths are provided for evaluating potential drift of active components of a system for simulating electromagnetic environments, where the active components are likely to exhibit variations and instabilities, without altering the standing wave contributions of the various passive paths that were calibrated out in an end-to-end path loss measurement. Although some embodiments refer to anechoic boundary array test apparatus, embodiments are not limited to such apparatus, but rather, apply generally to systems for simulating electromagnetic environments.

Figure 5:
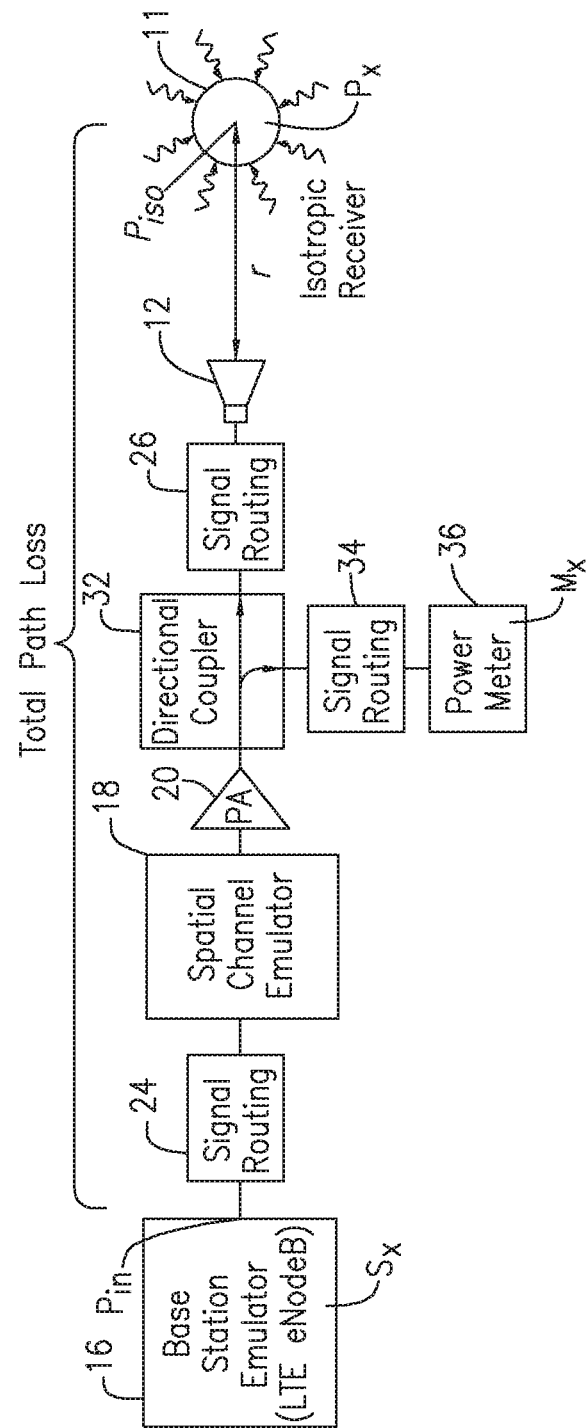
FIG. 5 illustrates an embodiment for measurement of the output power of an active portion of a path of system for simulating electromagnetic environments.

FIG. 5 illustrates an embodiment having a coupling apparatus such as a directional coupler 32 that couples energy from the power amplifier 20 to the signal routing 26 and to signal routing 34 of an alternative path that couples the power sampled by the directional coupler 32 to a power meter 36. Note that although a directional coupler is shown in the drawing figures, other embodiments may include splitters, circulators, or other passive or active coupling devices either as discrete cabled devices, embedded components in other system components, or even field probing antennas coupled to each antenna in the chamber. The path that includes the path from the power amplifier 20 to the antenna 12 is referred to herein as the operational path, whereas the path that includes the path from the power amplifier 20 to the power meter 36 is referred to herein as the monitoring path.

Figure 6:
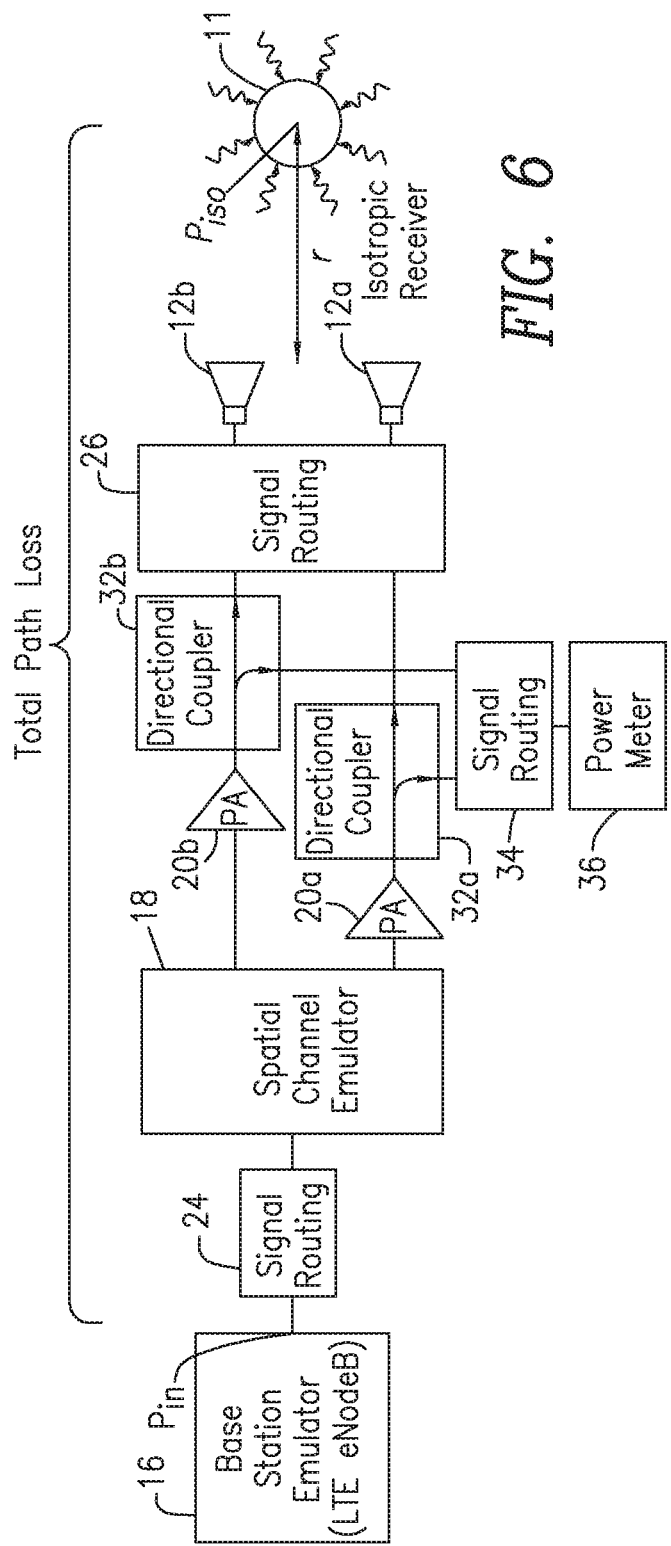
FIG. 6 illustrates an embodiment for measurement of output power of each of multiple paths of system for simulating electromagnetic environments.

The signal routing 34 may include a multiplexing switch matrix or a power combiner, for example. In this way, the power output of an active path can be evaluated in real time to confirm proper operation. In some embodiments, a directional coupler 32 may be at the output of each amplifier 20 with the outputs of a plurality of test ports of the directional couplers 32 combined by a switch matrix and fed to a single power meter 36. In some embodiments, there is a directional coupler 32a, 32b for each operational path and a single power meter receiving signals from each directional coupler 32a, 32b, as shown in FIG. 6. In an alternative embodiment, there is a separate power meter to measure the power of the output of each directional coupler 32a, 32b separately. In some embodiments, the outputs of the directional couplers directed to one or more power meters may be compared to each other.

Thus, during end-to-end OTA calibration, a reference level can be determined at the output of each amplifier 20 based on the power settings of the vector network analyzer 30 or other test equipment used in the calibration and settings of the channel emulator 18. By comparing the relative power levels of the individual paths measured by the power meters 36 subsequent to the end-to-end calibration to the power levels determined at the time of end-to-end calibration, any drift in the active path can be determined and corrected. This may include, not only drift of the power amplifier gain, but also variations of cables, switches and other operational path components. In other words, through the use of broadband power meters or similar sensing devices, the system 10 can be evaluated in real time to provide feedback and allow for compensation at the output of the channel emulator as needed.

The use of the power meter as a calibration tool may be understood as follows. If the difference, Lx, between the signal level in the test volume 11 and the signal level at the power meter 36 is known, (i.e., loss due to the directional coupler and associated cables are known or cancelled out when monitoring drift of the amplifier), for each path, then a path should be producing a power Px in the test volume 11. Then, the power meter 36 may produce a measured power, Mx=Px−Lx. In principle, the total power in the test volume 11 can be determined from all the measurements, Mx, to determine if the expected power levels are being produced in the test volume 11. Between the signal source Sx 16 and the test volume 11, there is amplification and loss, Ax, so that Px=Sx+Ax. In some applications, knowledge of Px is all that is desired. However, one can determine Mx=Sx+Ax−Lx. Since Sx and Lx are constant for a given path and setting, Mx is proportional to Ax. If the amplifier 20 varies, the measurement at the power meter 36 will vary accordingly. Thus, compensation of the amplifier gain can be made based on the measured power at the power meter 36. It should also be noted that it is not in fact necessary to know the various losses Lx and amplifications Ax when the primary concern is to ensure stability of the signals Px. Any changes in the measured signals Mx from their known reference values imply corresponding changes in Px that may be compensated for by altering Sx accordingly to return Mx to the original reference values.

Figures 7, 9:
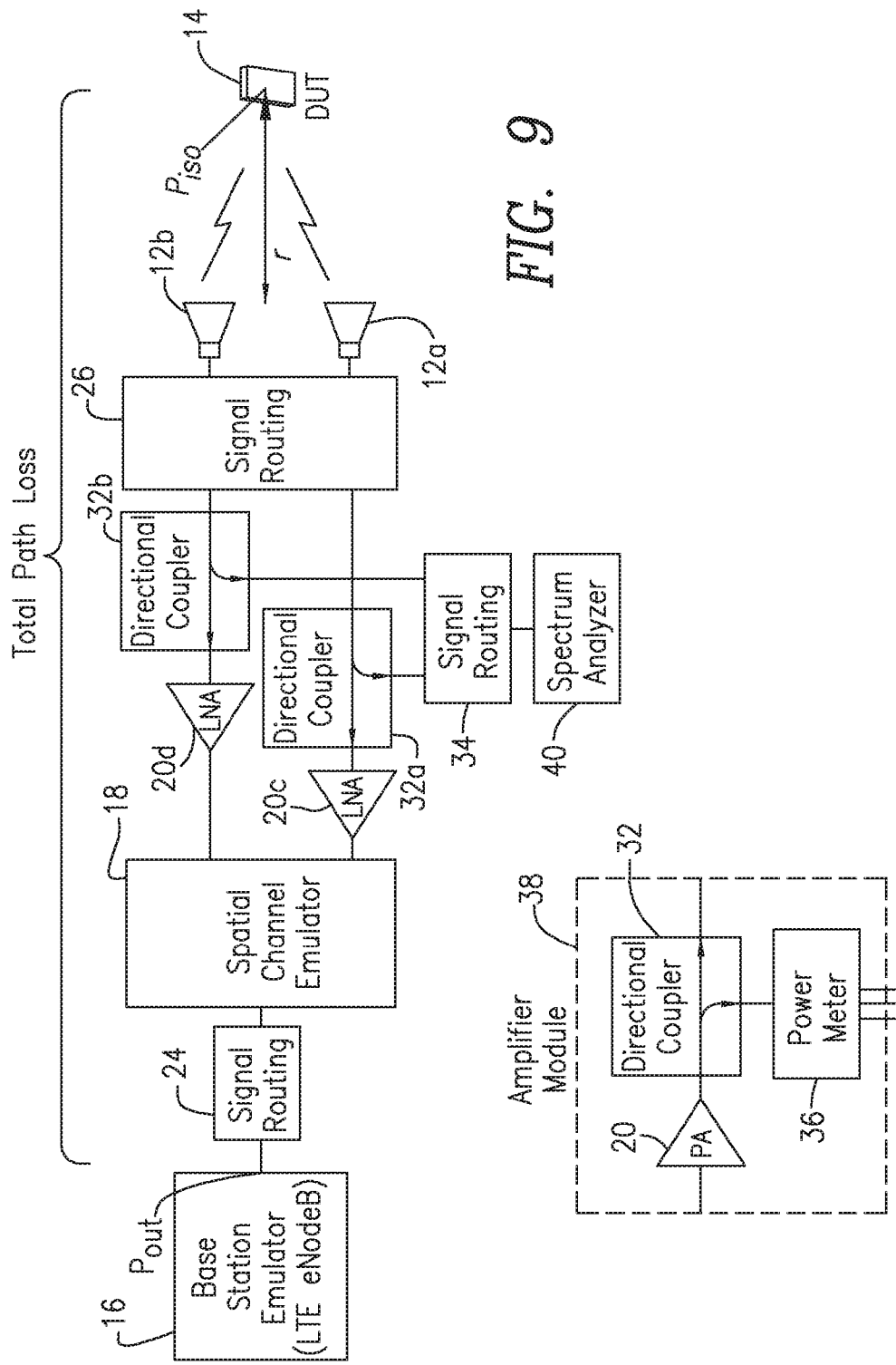
FIG. 7 illustrates an amplifier module having an integrated power amplifier, directional coupler and power meter.
FIG. 9 illustrates a configuration for measurement of power for calibration in an uplink configuration.

In some embodiments, the amplifier 20, the directional coupler 32 and the power meter 36 can be combined in a single integrated component 38, as shown in FIG. 7, so that each channel of the system 10 can be monitored digitally, without the need for external cabling, switching or test equipment.

Figure 8:
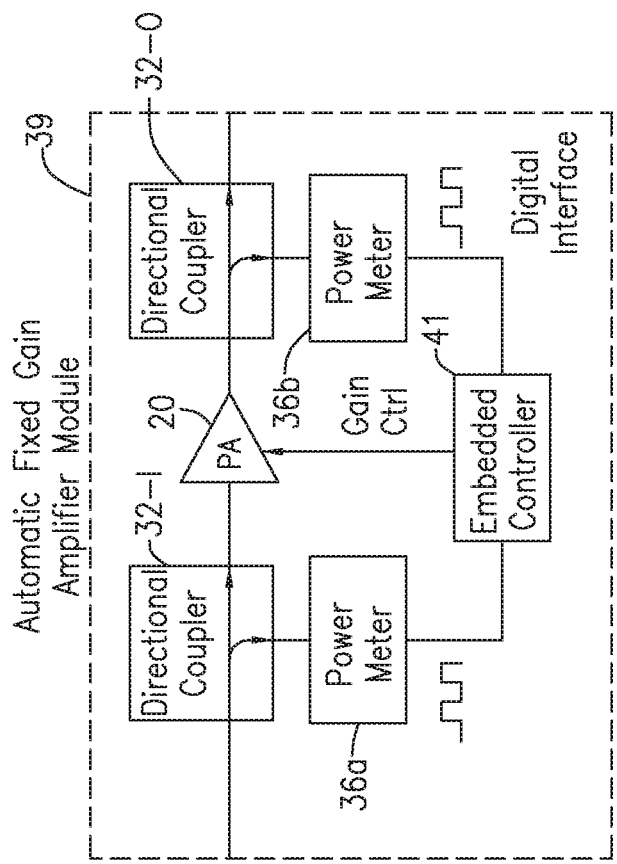
FIG. 8 illustrates an automatic amplifier gain measurement and adjustment apparatus.

In some embodiments, closed loop automatic gain control using an embedded controller may be implemented to provide feedback to adjust a gain of a power amplifier 20 whose output is measured by the power meter. Such an embodiment is shown in FIG. 8. Referring to FIG. 8, an automatic fixed gain amplifier module 39 includes an embedded controller 41 that receives an output of the power meters 36a and 36b and produces a gain control signal that adjusts the gain of the corresponding power amplifier 20. In the embodiment of FIG. 8, a directional coupler 32-I may be placed between the channel emulator 18 and the power amplifier 20 to couple a portion of the power output from the channel emulator 18 to the power meter 36a. A second directional coupler 32-O is placed at the output of the amplifier 20 to couple a portion of the power output of the power amplifier 20 to the power meter 36b. The difference between the output of the directional coupler 32-I and the output of directional coupler 32-O after the power amplifier 20 gives an estimate of the amplifier gain. This gain may be adjusted as needed to compensate for gain drift. Note that a splitter or similar component can be used instead of a directional coupler. Note also that the circuit of FIG. 8 can be used in the uplink configuration discussed with reference to FIG. 9. Note also that instead of, or in addition to, adjusting gain of the power amplifier 20, a gain of the channel emulator 18 may be adjusted to compensate for drift from calibrated values.

The gain adjustment may be based on a comparison of the calculated gain to a predetermined calibration value to determine if the gain of the power amplifier 20 has drifted over time. The predetermine calibration value may be determined at a time of performing an end-to-end calibration of the system 10. The gain control can be implemented by a combination of hardware and software. The directional couplers 32-I and 32-O, the power meters 36a, 36b, the power amplifier 20 and the embedded controller 41 can be integrated into a single module 39.

In some embodiments, feedback from the power meter 36 may be used to adjust an output level of the channel emulator 18. In such embodiments, in a normal mode of operation, test software executed by the channel emulator 18 introduces offsets to each output of the channel emulator 18 based on calibration corrections determined for each path. The use of the power meter 36 to monitor drift may allow real time adjustments to the calibration corrections.

An uplink path implementation is shown in FIG. 9. A device under test 14 radiates uplink signals captured by the antennas 12a and 12b. Note that in some embodiments fewer or more antennas may be implemented. Signal routing equipment 26 routes the uplink signals to first and second direction couplers 32a, 32b. A first portion of the uplink signal energy in each operational path is amplified by a low noise amplifier, 20c and 20d, and sent to the spatial channel emulator 18. A second portion of the uplink signal energy in each operational path is coupled to the signal routing equipment 34. This signal may then be monitored by a sensitive receiver, spectrum analyzer 40, or power meter or power sensor 36 to determine the input level to the amplifiers 20c and/or 20d. Since the input to most channel emulators also operate as a power meter, a separate power meter tap after an amplifier 20c, 20d, may not be necessary, although one may be used to monitor the output independently, if desired.

Thus, in the uplink configuration of FIG. 9, a test signal path is from the center of the test volume 11 where the device under test, (DUT) 14, is located to the base station emulator. The path that includes the path from the antenna 12 to the LNA 20 is the operational path, whereas the path that includes the path from the antenna 12 to the spectrum analyzer 40 is the monitoring path. The path loss along the test signal path is assumed to be known so that the power at the base station emulator 16, P_TE, is the power radiated from the test volume, P_OTA minus the path loss. However, if the amplifier 20 or other components drift, the path loss changes from its known value. To determine if there is drift of these components, a comparison can be made between the power received at the base station emulator 16 to the power injected to the amplifier 20. To perform this comparison in real time, i.e., during a test of the DUT 14, the directional coupler 32 taps a portion of the power from the test volume and the spectrum analyzer 40 measures that portion of the power. The remaining power from the directional coupler 32 is coupled to the amplifier 20 which amplifies the signal. The output of the amplifier 20 is input to the spatial channel emulator 18 and measured by a power meter within the spatial channel emulator 18. Therefore, the input to the amplifier 20 can be compared to the output of the amplifier 20 to monitor any drift of gain of the amplifier 20.

Thus, some embodiments advantageously provide a method and apparatus for determining a calibration state of each of at least one operational path in a system for simulating electromagnetic environments, where each operational path has an antenna 12 in communication with a test region, and where the calibration state of at least a portion of an operational path is determined without interruption of a portion of a power amplifier output signal coupled to the antenna 12.

In some embodiments, a system for simulating electromagnetic environments, such as an anechoic boundary array test apparatus, includes a channel emulator 18 having an output for each operational path. Each operational path includes at least a power amplifier 20, an antenna 12 and a first coupling apparatus 32 interposed between the power amplifier 20 and the antenna 12. The power amplifier 20 has an input coupled to an output path of the channel emulator 18. The power amplifier 20 has an output signal. The antenna 12 is in communication with the test region and configured to receive a first portion of the power amplifier output signal. The first coupling apparatus 32 has an input and at least two outputs and is configured to simultaneously couple the first portion of the power amplifier output signal to the antenna 12 and a second portion of the power amplifier output signal to a first monitoring path when the first portion of the power amplifier output signal is being coupled to the antenna 12, so that a calibration state of at least a portion of the operational path can be determined without interruption of the first portion of the power amplifier output signal coupled to the antenna 12.

In some embodiments, a first measurement device 36 in the first monitoring path is configured to measure the second portion of the power amplifier output signal. In some embodiments, the first measurement device 36 is combined with the first coupling apparatus 32 and the power amplifier 20 in a package install-able between the channel emulator 18 and the antenna 12.

In some embodiments, the apparatus further includes a second coupling apparatus 32-I having an input coupled to an output of the channel emulator 18, having a first output coupled to an input of the power amplifier 20, and having a second output coupled to a second monitoring path. In such embodiments, the apparatus may further include a controller 41 coupled to the first and second monitoring paths and configured to compare an output of the first coupling apparatus 32-O to an output of the second coupling apparatus 32-I to produce a gain control signal to control a gain of the power amplifier 20. In such embodiments, the gain control signal may be based at least in part on a stored calibration value. In such embodiments, the gain control signal may be set by the controller 41 so that the output of the first coupling apparatus 32-O coupled to the first monitoring path is about equal to the stored calibration value.

In some embodiments, a method of calibration of an anechoic boundary array test apparatus having a plurality of antennas 12 in communication with a test region is provided where each antenna 12 is in a different operational path of the apparatus. Each operational path has a power amplifier 20, a coupling device 32 and an antenna 12. The coupling device 32 is configured to simultaneously couple power to the antenna 12 and to a first monitoring path so that signal flow through the operational path is not interrupted when a signal in the first monitoring path is coupled to a power sensor 36. The method may include measuring power coupled to the first monitoring path while signal flow through the operational path is not interrupted and comparing the measured power to an expected value.

In some embodiments, the method further includes adjusting a gain of the power amplifier 20 in the operational path based on a result of the comparison. In some embodiments, the predetermined calibration value is based on a path loss measurement of an operational path that includes providing a reference antenna 28 in communication with the test region, the reference antenna 28 configured to receive power radiated into the test region by the antenna 12 in the operational path. In some embodiments, determining the path loss includes providing a network analyzer 30 or other signal generator/receiver combination having a receive port coupled to the reference antenna 28 and a transmit port coupled to an input of the operational path. In some embodiments, the method further includes determining an input calibration power level of the power amplifier 20 in the operational path.

In some embodiments, a system for simulating electromagnetic environments is provided that includes a channel emulator 18 having a plurality of outputs, each output associated with a different operational path. Each operational path has a power amplifier 20, an antenna 12 and a first coupling mechanism 32. The power amplifier 20 is coupled to an output of the channel emulator 18. The antenna 12 is in communication with a test region of the apparatus. The first coupling mechanism 32 simultaneously couples power to the antenna 12 and to a first monitoring path when the operational path is coupled to the test region, so that a calibration state of at least a portion of the operational path can be determined without interruption of a signal coupled to the antenna 12 in the operational path.

In some embodiments, the apparatus further includes a measurement device 36 coupled to the monitoring path, the measurement device 36 providing a measurement of an output of the power amplifier 20 in the operational path. In some embodiments, the apparatus further includes a comparator configured to compare the measurement to a calibration value. In such embodiments, the apparatus may further include a gain control device configured to adjust the gain of the power amplifier based on the comparison. The comparator and the gain control device may be included in an embedded controller 41. In such embodiments, the gain of the power amplifier 20 may be set so that the measure of the output of the power amplifier 20 is about equal to the calibration value. In some embodiments, the apparatus further includes a second coupling mechanism 32-I to couple an output of the channel emulator 18 to a second monitoring path. In such embodiments, a signal on the second monitoring path may be compared to a signal on the first monitoring path to determine an adjustment to a gain of the power amplifier 20.

Note that a similar methodology can be employed on the uplink path. Thus, in some embodiments, a system for simulating electromagnetic environments is provided to determine a calibration state of at least one operational path. The calibration state of an operational path is determined without interruption of a portion of a signal from an antenna 12 to an amplifier 20 in the operational path. The apparatus includes a channel emulator 18 having an input for each operational path. Each operational path includes an antenna 12 in communication with the test region and configured to receive uplink signals from a device under test 14 in the test region. Each operational path also includes an amplifier 20 having an output coupled to an input of the channel emulator 18 and having an input to receive a first portion of the uplink signals from the antenna 12. Each operational path also includes a first coupling apparatus 32 having an input receiving uplink signals from the antenna 12, and having at least two outputs. The coupling apparatus is configured to simultaneously couple the first portion of the uplink signals to the amplifier 20 and to couple a second portion of the uplink signals to a first monitoring path when the operational path is being used to test a device 14 in the test region, so that a calibration state of at least a portion of the operational path can be determined without interruption of the first portion of the uplink signals coupled to the amplifier 20.

In some embodiments, the apparatus further includes a first measurement device 40 in the first monitoring path configured to measure the second portion of the uplink signals. In some embodiments, the first measurement device 40 is combined with the first coupling apparatus 32a and the power amplifier 20a in a package install-able between the channel emulator 18 and the antenna 12a.

In some embodiments, a method is provided for monitoring calibration of a system for simulating electromagnetic environments having a plurality of antennas 12 in communication with a test region, each antenna 12 in a different operational path of the apparatus. Each operational path may have an amplifier 20, a coupling device 32 and an antenna 12. The coupling device 32 is configured to simultaneously couple power from the antenna 12 to a first monitoring path so that a signal flow through the operational path is not interrupted when a signal in the first monitoring path is coupled to a power sensor 40. The method includes measuring power coupled to the first monitoring path while signal flow through the operational path is not interrupted; and comparing the measured power to an expected value.

Note that the methods described above for the uplink and the downlink can be combined to form a bidirectional system with directional couplers for coupling power amplifiers in both the uplink and the downlink to test devices such as power meters or spectrum analyzers.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An electromagnetic measurement system for testing a device in a test region, the system comprising:
  a channel emulator configured to emulate a plurality channels;
  a plurality of operational paths, each operational path having:
    a channel emulator output;
    an amplifier configured to receive and amplify a signal from the channel emulator output;
    an antenna; and
    a first coupling device, the first coupling device configured to receive the amplified signal and couple a first portion of the amplified signal to the antenna and to couple a second portion of the amplified signal to a measurement device in a corresponding output monitoring path;
  a first comparator configured to compare the second portion of the amplified signal to a predetermined calibration value for the operational path as determined by an end-to-end over-the-air calibration of the operational path; and
  the corresponding output monitoring path for each of the plurality of operational paths, each corresponding output monitoring path having the measurement device to receive and measure the second portion of the amplified signal;
  wherein the channel emulator being adjustable, for each operational path, to compensate for change in the operational path from the predetermined calibration value determined by the end-to-end over-the-air calibration of the operational path, an adjustment of the channel emulator being based on the comparison.

2. The system of claim 1, wherein the measurement device, first coupling device and amplifier are combined in a signal package remove-ably installable between the channel emulator and the antenna.

3. The system of claim 1, further comprising a second comparator configured to compare measurements from measurement devices of a plurality of corresponding output monitoring paths corresponding to a plurality of different operational paths.

4. The system of claim 1, further comprising, for the operational path, a second coupling device having:
  an input coupled to the channel emulator output of the operational path,
  a first output coupled to an input of the amplifier of the operational path, and
  a second output coupled to an input measurement device in an input monitoring path, the input measurement device configured to measure a power of the second output.

5. The system of claim 4, further comprising a second comparator configured to determine a difference between a power measurement of the measurement device in the corresponding output monitoring path corresponding to the operational path to the power measurement of the input measurement device to determine a gain control signal; and
  wherein the gain control signal applicable to control a gain of the amplifier of the operational path so that the power measurement of the measurement device in the corresponding output monitoring path corresponding to the operational path becomes about equal to the predetermined calibration value.

6. The system of claim 1, wherein the channel emulator is adjustable to compensate for the change in the operational path by introducing at least one of a gain and an offset to the channel emulator output based on the predetermined calibration value.

7. The system of claim 1, wherein the amplifier is adjustable to compensate for the change in the operational path by changing the gain of the amplifier based on a comparison of a measurement by the measurement device to the predetermined calibration value.

8. A method for monitoring calibration of a system for testing a device in a test region, the system having a channel emulator having a plurality of outputs, one output for each of a plurality of operational paths, each operational path having a channel emulator output, an amplifier configured to receive and amplify a signal from the channel emulator output, an antenna, and a coupling device, the coupling device configured to receive the amplified signal and couple a first portion of the amplified signal to the antenna and to couple a second portion of the amplified signal to a measurement device in a corresponding monitoring path corresponding to each operational path, the method comprising:
 performing an end-to-end over-the-air calibration of each operational path to predetermine a calibration value for each operational path;
 measuring in each corresponding monitoring path by the measurement device, the second portion of the amplified signal coupled by the coupling device to the measurement device; and
 for each operational path, comparing the measurement in the corresponding monitoring path to the predetermined calibration value determined by the end-to-end over-the-air calibration of the operational path to enable compensation for change in the operational path from the predetermined calibration value and to simultaneously maintain calibration in each operational path of the plurality of operational paths by:
 adjusting, so as to maintain calibration, at least one of a gain and an offset of a channel emulator output for the operational path to compensate for a change in the operational path, the adjusting being based on the comparison.

9. The method of claim 8, further comprising adjusting a gain of the amplifier to compensate for change in the operational path based on the comparison.

10. The method of claim 8, further comprising comparing a measurement in a first corresponding monitoring path corresponding to a first operational path of the plurality of different operational paths to a measurement in a second corresponding monitoring path corresponding to a second operational path of the plurality of different operational paths.

11. An electromagnetic measurement system for testing a device in a test region, the system comprising:
 a channel emulator configured to emulate a plurality channels;
 a plurality of operational paths, each operational path having:
  an antenna configured to receive electromagnetic energy generated by the device under test to produce a signal;
  a first coupling device configured to receive the signal from the antenna and to couple a first portion of the signal to an amplifier and to couple a second portion of the signal to a measurement device in a corresponding input monitoring path;
  the amplifier configured to amplify the first portion of the signal;
  a channel emulator input configured to measure first power received from the amplifier; and
  a first comparator configured to:
   compare the first power measured by the channel emulator input to a second power measured by the measurement device; and
   determine an extent of deviation from a predetermined calibration value determined by an end-to-end over-the-air calibration of the operational path to enable compensation for change in the operational path from the predetermined calibration value; and
 for each operational path, adjusting the channel emulator to compensate for a change in the operational path, the adjusting based on the determined deviation.

12. The system of claim 11, wherein the measurement device, coupling device and amplifier are combined in a signal package remove-ably installable between the channel emulator and the antenna.

13. The system of claim 11, further comprising a second comparator configured to compare measurements from measurement devices of a plurality of corresponding input monitoring paths each corresponding input monitoring path corresponding to a different one of the plurality of operational paths.

14. The system of claim 11, further comprising, for the operational path, a second coupling device having:
 an input coupled to an output of the amplifier,
 a first output coupled to the channel emulator input, and
 a second output coupled to an output measurement device in an output monitoring path, the output measurement device configured to measure a power of the second output.

15. The system of claim 14, further comprising a second comparator configured to compare the power of the second output to the second power measured by the measurement device in the corresponding input monitoring path corresponding to the operational path to determine a gain control signal applicable to adjust one of a gain and an offset of the channel emulator so that the power measurement of the measurement device in the corresponding input monitoring path corresponding to the operational path becomes about equal to the predetermined calibration value.

16. A method for monitoring calibration of a system for testing a device in a test region, the system having a plurality of operational paths, each operational path having an antenna, a coupling device, an amplifier, and a channel emulator input, the antenna configured to receive electromagnetic energy generated by the device under test, the coupling device configured to couple a first portion of energy received by the antenna to the amplifier and configured to couple a second portion of the energy received by the antenna to a measurement device in a corresponding monitoring path corresponding to each operational path, the amplifier configured to amplify the first portion of the energy, the method comprising, for each operational path:
 measuring, by the channel emulator input, first power received from the amplifier;
 measuring, by the measurement device, second power received on the corresponding monitoring path;
 comparing the first power measured by the channel emulator input to the second power measured by the measurement device; and
 determining an extent of deviation from a predetermined calibration value determined by an end-to-end over-the-air calibration of the operational path to enable compensation for change in the operational path from the predetermined calibration value; and adjusting the channel emulator to compensate for change in the operational path from the predetermined calibration value.

17. The method of claim 16, further comprising comparing via a second comparator measurements from measurement devices of a plurality of corresponding monitoring paths, each corresponding monitoring path coupling power from a different one of the plurality of operational paths.

18. The system of claim 16, wherein compensation for the change in operational path includes compensation for deviations in impedance of connectors and cables in the operational path.

* * * * *